United States Patent
Kimura et al.

(10) Patent No.: US 12,447,150 B2
(45) Date of Patent: Oct. 21, 2025

(54) TREATMENT OF CANCER BY COMBINATION OF IMMUNE CHECKPOINT INHIBITOR AND FOLFIRINOX THERAPY

(71) Applicant: ONO PHARMACEUTICAL CO., LTD., Osaka (JP)

(72) Inventors: Keisuke Kimura, Osaka (JP); Masataka Kuroda, Osaka (JP); Takeyuki Iwata, Osaka (JP)

(73) Assignee: ONO PHARMACEUTICAL CO., LTD., Osaka (JP)

( * ) Notice: Subject to any disclaimer, the term of this patent is extended or adjusted under 35 U.S.C. 154(b) by 923 days.

(21) Appl. No.: 17/297,339

(22) PCT Filed: Nov. 26, 2019

(86) PCT No.: PCT/JP2019/046048
§ 371 (c)(1),
(2) Date: May 26, 2021

(87) PCT Pub. No.: WO2020/111018
PCT Pub. Date: Jun. 4, 2020

(65) Prior Publication Data
US 2022/0008421 A1 Jan. 13, 2022

(30) Foreign Application Priority Data
Nov. 27, 2018 (JP) ................. 2018-220866

(51) Int. Cl.
| | | |
|---|---|---|
| A61K 31/519 | (2006.01) | |
| A61K 31/282 | (2006.01) | |
| A61K 31/4745 | (2006.01) | |
| A61K 31/513 | (2006.01) | |
| A61K 39/395 | (2006.01) | |
| A61P 35/00 | (2006.01) | |

(52) U.S. Cl.
CPC .......... *A61K 31/519* (2013.01); *A61K 31/282* (2013.01); *A61K 31/4745* (2013.01); *A61K 31/513* (2013.01); *A61K 39/3955* (2013.01); *A61P 35/00* (2018.01)

(58) Field of Classification Search
CPC ............ A61K 31/519; A61K 31/282; A61K 31/4745; A61K 31/513; A61K 39/3955; A61K 9/0019; A61K 2039/505; A61K 2039/545; A61K 39/395; A61K 2300/00; A61P 35/00; A61P 1/18; A61P 35/04
See application file for complete search history.

(56) References Cited

FOREIGN PATENT DOCUMENTS

| | | | | |
|---|---|---|---|---|
| WO | 2018/183608 A1 | 10/2018 | | |
| WO | WO-2019139583 A1 * | 7/2019 | ......... | A61K 31/4439 |

OTHER PUBLICATIONS

Clinical Trial NCT01896869. FOLFIRINOX Followed by Ipilimumab With Pancreatic Tumor Vaccine in Treatment of Metastatic Pancreatic Cancer, Version 16: Jul. 18, 2017. (Year: 2017).*
Clinical Trial NCT03563248. Losartan and Nivolumab in Combination With FOLFIRINOX and SBRT in Localized Pancreatic Cancer , Version 1: Jun. 19, 2018. (Year: 2018).*
Clinical Trial NCT02980510. Comparison FOLFIRINOX Panitumumab vs mFOLFOX6 Panitumumab in RAS/B-RAF Wild-type Metastatic Colorectal Cancer Patients (PANIRINOX), Version 4: May 22, 2017. (Year: 2017).*
Luchini et al., Pancreatic cancer arising in the remnant pancreas is not always a relapse of the preceding primary. Modern Pathology. 2018. 32: 659-665. (Year: 2018).*
Pol et al. Trial Watch: Immunogenic cell death inducers for anticancer chemotherapy, Oncoimmunology 2015 4(4): 1-13. (Year: 2015).*
Rizvi et al. Nivolumab in Combination With Platinum-Based Doublet Chemotherapy for First-Line Treatment of Advanced Non-Small-Cell Lung Cancer. J Clin Oncol 2016; 34(25):2969-2979. (Year: 2016).*
Long et al. Assessment of nivolumab exposure and clinical safety of 480mg every 4 weeks flat-dosing schedule in patients with cancer. Annal Oncol 2018; 29:2208-2213. (Year: 2018).*
DailyMed, Drug Label Information: OPDIVO—nivolumab injection. Last updated Mar. 6, 2024. (Year: 2024).*
National Cancer Institute. Leucovorin Calcium, Aug. 21, 2008. (Year: 2008).*
Muranaka et al. Comparison of efficacy and toxicity of FOLFIRINOX and gemcitabine with nab-paclitaxel in unresectable pancreatic cancer. J Gastrointest Oncol 2017; 8(3):566-571. (Year: 2017).*
Yoshida et al. A multicenter prospective phase II study of first-line modified FOLFIRINOX for unresectable advanced pancreatic cancer. Oncotarget, 2017; 8(67):111346-111355 (Year: 2017).*
Long et al. Assessment of nivolumab exposure and clinical safety of 480mg every 4 weeks flat-dosing schedule in patients with cancer. Oncol, 2018; 29:2208-2213 (Year: 2018).*
Clinical Trial No. Combination of Anti-PD-1 Antibody and Chemotherapy in Metastatic Pancreatic Cancer. NCT03977272 Record History; ver. 1: Jun. 5, 2019. (Year: 2019).*
Clinical Trial No. NCT03250273. A Clinical Trial of Entinostat in Combination With Nivolumab for Patients With Previously Treated Unresectable or Metastatic Cholangiocarcinoma and Pancreatic Adenocarcinoma. Record History; ver. 4: May 16, 2019. (Year: 2019).*
GMT Fine Chemicals. Calcium Levofolinate, Nov. 7, 2019. (Year: 2019).*
Morizane et al. A Phase 2 study of nivolumab in combination with modified FOLFIRINOX for metastatic pancreatic cancer. BJC Rep , 2024; 2(1):1-7. (Year: 2024).*
Clinical Trial No. NCT03563248. Losartan and Nivolumab in Combination With FOLFIRINOX and SBRT in Localized Pancreatic Cancer. Record History; ver. 2: Sep. 14, 2018. (Year: 2018).*

(Continued)

*Primary Examiner* — Daniel E Kolker
*Assistant Examiner* — Maureen Varina Driscoll
(74) *Attorney, Agent, or Firm* — Sughrue Mion, PLLC (57) ABSTRACT

A new therapeutic method in which a combination of an immune checkpoint inhibitor and a FOLFIRINOX therapy, a modified FOLFIRINOX therapy or a dose-reducing regimen of each of the therapies is effective to treat cancer, particularly cancer difficult to treat with conventional therapies such as pancreatic cancer.

17 Claims, 1 Drawing Sheet

(56) References Cited

OTHER PUBLICATIONS

Cheng, Xianliang et al., "Combination Immunotherapy Approaches for Pancreatic Cancer Treatment", Canadian Journal of Gastroenterology and Hepatology, Mar. 7, 2018, vol. 2018, Article ID 6240467, pp. 1-7.
Office Action issued on Feb. 20, 2024 by the Japanese Patent Office in corresponding JP Patent Application No. 2020-557713.
Written Opinion (PCT/ISA/237) issued Jan. 28, 2020, issued by the International Searching Authority in counterpart International Application No. PCT/JP2019/046048.
Search Report (PCT/ISA/210) issued Jan. 28, 2020, issued by the International Searching Authority in counterpart International Application No. PCT/JP2019/046048.
Anonymous, "History of Changes for Study: NCT03563248—Losartan and Nivolumab in Combination With FOLFIRINOX and SBRT in Localized Pancreatic Cancer" Jun. 2019, U.S. National Library of Medicine, https://clinicaltrials.gov/ct2/show/NCT03563248, 17 pages total.
Anonymous, "Guide of Campto I.V. infusion 40mg/100mg for proper use", 2014, (unofficial translation of title), 4 pages total.
Patel, et al., "A phase 2, multicenter study of FOLFIRINOX followed by ipilimumab in combination with allogeneic GM-CSF transfected pancreatic tumor vaccine in the treatment of metastatic pancreatic cancer", abstract, 2017, Journal of Clinical Oncology, vol. 32, No. 15_suppl, 2 pages total.
Pol, et al., "Trial Watch: Immunogenic cell death inducers for anticancer chemotherapy", 2015, OncoImmunology, vol. 4, Issue No. 4, 13 pages total.
Fumet, et al., "Phase Ib/II trial evaluating the safety, tolerability and immunological activity of durvalumab (MEDI4736) (anti-PD-L1) plus tremelimumab (anti-CTLA-4) combined with FOLFOX in patients with metastatic colorectal cancer", Apr. 2018, ESMO Open, vol. 3, Issue No. 4, 9 pages total.
Dosset, et al., "PD-1/PD-L1 pathway: an adaptive immune resistance mechanism to immunogenic chemotherapy in colorectal cancer", Mar. 2018, ONCOIMMUNOLOGY, vol. 7, Issue No. 6, 15 pages total.
Communication dated Jun. 20, 2025, issued by the Korean Patent Office in Korean Application No. 10-2021-7015103.
Mustafa et al. "FOLFIRINOX for locally advanced pancreatic cancer a systematic review and patient-level meta-analysis" The Lancet Oncology, 2016, vol. 17, pp. 801-810 (10 pages total).

\* cited by examiner

TREATMENT OF CANCER BY COMBINATION OF IMMUNE CHECKPOINT INHIBITOR AND FOLFIRINOX THERAPY

CROSS REFERENCE TO RELATED APPLICATIONS

This application is a National Stage of International Application No. PCT/JP2019/046048 filed Nov. 26, 2019, claiming priority based on Japanese Patent Application No. 2018-220866 filed Nov. 27, 2018, the entire contents of which are incorporated by reference herein.

TECHNICAL FIELD

The present invention relates to the cancer therapy in combination with the immune checkpoint inhibitor and FOLFIRINOX therapy.

BACKGROUND ART

FOLFIRINOX therapy (hereinafter, may be abbreviated as "FFX therapy") is one of standard treatments which have been being performed for patients with unresectable pancreatic cancer. However, it is known that adverse events such as bone marrow suppression, nausea, vomiting frequently occur and the like occur with high frequency, and in order to reduce them, modified FOLFIRINOX therapy (hereinafter, abbreviated as "mFFX therapy") of which the dose is reduced also has been being provided.

Unlike conventional therapies such as chemotherapy, cancer immunotherapy which suppresses or treats the progression of cancer by strengthening the immune system against cancer through acting on the immune surveillance which is inherent in a patient with cancer has been attracting attention in recent years. In particular, inhibitors against immune checkpoint molecules such as PD-1 (Programmed Cell Death-1) or its ligand PD-L1 (Programmed Cell Death Ligand-1), so-called immune checkpoint inhibitors (hereinafter, may be abbreviated as "immune CP inhibitor") have achieved certain results in clinical practice.

As a combination of these therapies in cancer treatment, preoperative therapy in which FFX therapy, anti-PD-1 antibody Nivolumab and radiation therapy were combined has been clinically tested in patients with pancreatic cancer without metastasis (Non-patent literature 1).

CITATION LIST

Non Patent Literature

Non-Patent Literature 1: ClinicalTrials.gov, "Losartan and Nivolumab in Combination With FOLFIRINOX and SBRT in Localized Pancreatic Cancer", Internet <URL: https://clinicaltrials.gov/ct2/show/NCT03563248>

SUMMARY OF INVENTION

Technical Problem

A purpose of the present invention is to provide a new cancer therapy.

Solution to Problem

As a result of intensive studies, the inventors of the present invention have found that a therapy in which a combination with the immune checkpoint inhibitor and FOLFIRINOX therapy or a dose-reducing regimen thereof is prescribed can be an effective cancer therapy, and completed the present invention.

That is, the present invention is as follows:

[1] An agent for suppressing the progression of, suppressing the recurrence of and/or treating cancer containing an immune checkpoint inhibitory substance (hereinafter, may be abbreviated as "immune CP inhibitory substance"), as an active ingredient, which is characterized by being administered in combination with FFX therapy or a dose-reducing regimen thereof;

[2] the agent according to the preceding item [1], wherein the immune CP inhibitory substance is administered at about 1 to 10 mg/kg (body weight) per dose or at about 200 to 1200 mg per dose every about 2 to 4 weeks;

[3] the agent according to the preceding item [1] or [2], wherein the immune CP inhibitory substance is administered at 1 mg/kg, 2 mg/kg, 3 mg/kg, 4 mg/kg, 5 mg/kg, 6 mg/kg, 7 mg/kg, 8 mg/kg, 9 mg/kg or 10 mg/kg (body weight) per dose;

[4] the agent according to the preceding item [1] or [2], wherein the immune CP inhibitory substance is administered at 200 mg, 240 mg, 250 mg, 280 mg, 300 mg, 320 mg, 350 mg, 360 mg, 400 mg, 420 mg, 450 mg, 480 mg, 500 mg, 540 mg, 560 mg, 600 mg, 640 mg, 700 mg, 720 mg, 750 mg, 800 mg, 840 mg, 900 mg, 1000 mg, 1080 mg 1100 mg, 1120 mg or 1200 mg per dose;

[5] the agent according to any one of the preceding items [1] to [4], wherein the immune CP inhibitory substance is administered every 2 weeks, 3 weeks or 4 weeks;

[6] the agent according to any one of the preceding items [1] to [5], wherein the immune CP inhibitory substance is intravenously administered for about 30 minutes to about 60 minutes or for 60 minutes or more;

[7] the agent according to any one of the preceding items [1] to [6], wherein the immune CP inhibitory substance is an anti-PD-1 antibody, anti-PD-L1 antibody or anti-CTLA-4 antibody;

[8] the agent according to any one of the preceding items [1] to [6], wherein the immune CP inhibitory substance is an anti-PD-1 antibody;

[9] the agent according to the preceding item [8], wherein the anti-PD-1 antibody is Nivolumab, Cemiplimab, Pembrolizumab, Spartalizumab, Tislelizumab, AMP-514, Dostarlimab, Toripalimab, Camrelizumab, Genolimzumab, Sintilimab, STI-A1110, ENUM 388D4, ENUM 244C8, GLS010, MGA012, AGEN2034, CS1003, HLX10, BAT-1306, AK105, AK103, BI 754091, LZM009, CMAB819, Sym021, GB226, SSI-361, JY034, HX008, ISU106, ABBV181, BCD-100, PF-06801591, CX-188, JNJ-63723283 or AB122;

[10] the agent according to the preceding item [7], wherein the immune CP inhibitory substance is an anti-PD-L1 antibody, and the anti-PD-L1 antibody is Atezolizumab, Avelumab, Durvalumab, BMS-936559, STI-1014, KN035, LY3300054, HLX20, SHR-1316, CS1001, MSB2311, BGB-A333, KL-A167, CK-301, AK106, AK104, ZKAB001, FAZ053, CBT-502, JS003 or CX-072;

[11] the agent according to the preceding item [7], wherein the immune CP inhibitory substance is an anti-CTLA-4 antibody and the anti-CTLA-4 antibody is Ipilimumab, AGEN1884 or Tremelimumab;

[12] the agent according to the preceding item [8], wherein the anti-PD-1 antibody is Nivolumab;

[13] the agent according to the preceding item [8], wherein the anti-PD-1 antibody is Pembrolizumab;

[14] the agent according to the preceding item [8], wherein the anti-PD-1 antibody is Cemiplimab;
[15] the agent according to the preceding item [10], wherein the anti-PD-L1 antibody is Avelumab;
[16] the agent according to the preceding item [10], wherein the anti-PD-L1 antibody is Atezolizumab;
[17] the agent according to the preceding item [10], wherein the anti-PD-L1 antibody is Durvalumab;
[18] the agent according to the preceding item [11], wherein the anti-CTLA-4 antibody is Ipilimumab;
[19] the agent according to the preceding item [12], wherein Nivolumab is administered at 3 mg/kg (body weight) per dose or 240 mg per dose every 2 weeks, or 480 mg per dose every 4 weeks;
[20] the agent according to the preceding item [12], wherein Nivolumab is administered at 480 mg per dose every 4 weeks;
[21] the agent according to the preceding item [12], wherein Nivolumab is administered at 480 mg per dose every 4 weeks intravenously over about 30 minutes;
[22] the agent according to the preceding item [13], wherein Pembrolizum is administered at 2 mg/kg (body weight) per dose or 200 mg per dose every 3 weeks;
[23] the agent according to the preceding item [14], wherein Cemiplimab is administered at 350 mg per dose every 3 weeks;
[24] the agent according to the preceding item [15], wherein Avelumab is administered at 10 mg/kg (body weight) per dose every 2 weeks;
[25] the agent according to the preceding item [16], wherein Atezolizumab is administered at 1200 mg per dose every 3 weeks;
[26] the agent according to the preceding item [17], wherein Durvalumab is administered at 10 mg/kg (body weight) per dose every 2 weeks;
[27] the agent according to the preceding item [18], wherein Ipilimumab is intravenously administered at 3 mg/kg (body weight) or 1 mg/kg (body weight) per dose every 3 weeks 4 times;
[28] the agent according to any one of the preceding items [1] to [27], which is characterized by being administered in combination with FFX therapy, wherein in the FFX therapy, oxaliplatin (hereinafter, abbreviated as "L-OHP") is intravenously administered at 85 mg/m$^2$ over 2 hours, and then levofolinate calcium (hereinafter, abbreviated as "l-LV") is intravenously administered at 200 mg/m$^2$ over 2 hours and 30 minutes after the start of l-LV administration, irinotecan hydrochloride hydrate (hereinafter, abbreviated as "CPT-11") is intravenously administered at 180 mg/m$^2$ over 1.5 hours, and further, after completion of l-LV administration, 5-FU is rapidly, intravenously administered at 400 mg/m$^2$, and furthermore, 5-FU is continuously, intravenously administered at 2400 mg/m$^2$ over 46 hours, and a series of the preceding administrations (hereinafter, any of administrations at the second and subsequent time among a "series of administration" may be referred to as "any of administrations at the second and subsequent cycle") is performed every 2 weeks;
[29] the agent according to the preceding item [28], wherein depending on the degree of the side effect in a patient in any of administrations at the second and subsequent cycle in the FFX therapy, the rapid intravenous administration of 5-FU is discontinued;
[30] the agent according to the preceding item [28] or [29], wherein depending on the degree of the side effect in a patient in any of administrations at the second and subsequent cycle in the FFX therapy, the dose of L-OHP is reduced or the administration thereof is discontinued;
[31] the agent according to any one of the preceding items [28] to [30], wherein depending on the degree of the side effect in a patient in any of administrations at the second and subsequent cycle in the FFX therapy, the dose of CPT-11 is reduced or the administration thereof is discontinued;
[32] the agent according to any one of the preceding items [28] to [31], wherein depending on the degree of the side effect in a patient in any of administrations at the second and subsequent cycle in the FFX therapy, the dose of 5-FU to be continuously, intravenously administered is reduced;
[33] the agent according to the preceding item [28], wherein in the FFX therapy, the rapid intravenous administration of 5-FU is not carried out;
[34] the agent according to the preceding item [28], [30] or [33], wherein the dose of L-OHP in the FFX therapy, or the dose of L-OHP to be reduced depending on the degree of side effect in a patient in any of administrations at the second and subsequent cycle of the FFX therapy is about 65 mg/m$^2$, about 50 mg/m$^2$ or an arbitrary dose between about 85 and about 50 mg/m$^2$;
[35] the agent according to the preceding item [28], [31], [33] or [34], wherein the dose of CPT-11 in the FFX therapy, or the dose of CPT-11 to be reduced depending on the degree of side effect in a patient in any of administrations at the second and subsequent cycle of the FFX therapy is about 150 mg/m$^2$, about 120 mg/m$^2$, about 90 mg/m$^2$ or an arbitrary dose between about 180 and about 90 mg/m$^2$;
[36] the agent according to any one of the preceding items [28] and [32] to [35], wherein the dose of 5-FU to be continuously, intravenously administered in the FFX therapy, or the dose of 5-FU to be continuously, intravenously administered, and to be reduced depending on the degree of side effect in a patient in any of administrations at the second and subsequent cycle of the FFX therapy is about 1800 mg/m$^2$, about 1200 mg/m$^2$ or an arbitrary dose between about 2400 and about 1200 mg/m$^2$;
[37] the agent according to any one of the preceding items [1] to [27], which is characterized by being administered in combination with a dose-reducing regimen of FFX therapy, wherein in the dose-reducing regimen of FFX therapy, L-OHP is intravenously administered at 85 mg/m$^2$ over 2 hours, and then l-LV is intravenously administered at 200 mg/m$^2$ over 2 hours and 30 minutes after the start of l-LV administration, CPT-11 is intravenously administered at 150 mg/m$^2$ over 1.5 hours, and further, after completion of l-LV administration, 5-FU is intravenously administered at 2400 mg/m$^2$ over 46 hours, and a series of the preceding administrations is performed every 2 weeks (the dose-reducing regimen corresponds to "mFFX therapy");
[38] the agent according to the preceding item [37], wherein depending on the degree of the side effect in a patient in any of administrations at the second and subsequent cycle in the dose-reducing regimen of FFX therapy described in the preceding item [37], the dose of L-OHP is reduced or the administration thereof is discontinued;
[39] the agent according to the preceding item [37] or [38], wherein depending on the degree of the side effect in a patient in any of administrations at the second and subsequent cycle in the dose-reducing regimen of FFX therapy described in the preceding item [37], the dose of CPT-11 is reduced or the administration thereof is discontinued;
[40] the agent according to any one of the preceding items [37] to [39], wherein depending on the degree of the side effect in a patient in any of administrations at the second and subsequent cycle in the dose-reducing regimen of FFX therapy described in the preceding item [37], the dose of 5-FU to be continuously, intravenously administered is reduced;

[41] the agent according to the preceding item [37] or [38], wherein the dose of L-OHP in the dose-reducing regimen of FFX therapy described in the preceding item [37], or the dose of L-OHP to be reduced depending on the degree of side effect in a patient in any of administrations at the second and subsequent cycle of the dose-reducing regimen is about 65 mg/m$^2$, about 50 mg/m$^2$ or an arbitrary dose between about 85 and about 50 mg/m$^2$;

[42] the agent according to the preceding item [37], [39] or [41], wherein the dose of CPT-11 in the dose-reducing regimen of FFX therapy described in the preceding item [37], or the dose of CPT-11 to be reduced depending on the degree of side effect in a patient in any of administrations at the second and subsequent cycle of the dose-reducing regimen is about 120 mg/m$^2$, about 90 mg/m$^2$ or an arbitrary dose between about 150 and about 90 mg/m$^2$;

[43] the agent according to any one of the preceding items [37] and [40] to [42], wherein the dose of 5-FU to be continuously, intravenously administered in the dose-reducing regimen of FFX therapy described in the preceding item [37], or the dose of 5-FU to be continuously, intravenously administered, and to be reduced depending on the degree of side effect in a patient in any of administrations at the second and subsequent cycle of the dose-reducing regimen is about 1800 mg/m$^2$, about 1200 mg/m$^2$ or an arbitrary dose between about 2400 and about 1200 mg/m$^2$;

[44] the agent according to any one of the preceding items [1] to [43], wherein in the case that the administrations of the immune CP inhibitory substance and FFX therapy or a dose-reducing regimen thereof are prescribed on the same day, the immune CP inhibitory substance is initially administered, and at least about 30 minutes after completion of administration of the immune CP inhibitory substance, FFX therapy or a dose-reducing regimen thereof is started;

[45] the agent according to any one of the preceding items [1] to [44], wherein the administrations of the immune CP inhibitory substance and FFX therapy or a dose-reducing regimen thereof are initially prescribed on the same day;

[46] the agent according to any one of the preceding items [28] to [45], wherein depending on the degree of side effect in a patient to which the FFX therapy or the dose-reducing regimen thereof was prescribed, any of a series of administrations at the second or subsequent cycle is temporarily or continuously prescribed every 3 weeks or 4 weeks;

[47] the agent according to anyone of the preceding items [1] to [46], wherein the cancer is solid cancer or hematological cancer;

[48] the agent according to the preceding item [47], wherein the cancer is solid cancer, and the solid cancer is one or more cancers selected from malignant melanoma (e.g., malignant melanoma in the skin, oral mucosal epithelium, or orbit, etc.), non-small cell lung cancer (e.g., squamous non-small cell lung cancer and non-squamous non-small cell lung cancer), small cell lung cancer, head and neck cancer (e.g., oral cavity cancer, nasopharyngeal cancer, oropharyngeal cancer, hypopharyngeal cancer, laryngeal cancer, nasopharyngeal cancer, salivary gland cancer and tongue cancer), renal cell cancer (e.g., clear cell renal cell carcinoma), breast cancer, ovarian cancer (e.g., serous ovarian cancer and ovary clear cell adenocarcinoma), uterine cancer (e.g., cervical cancer and endometrial cancer), anal cancer (e.g., anal canal cancer), colorectal cancer, rectal cancer, colon cancer, hepatocellular cancer, esophageal cancer, gastric cancer, esophagus gastric junction career, pancreatic cancer (e.g., pancreatic ductal cancer, insulinoma and intraductal papillary mucinous neoplasm), urothelial cancer (e.g., bladder cancer, upper urinary tract cancer, ureteral cancer, renal pelvis cancer and urethral cancer), prostate cancer, fallopian tube cancer, primary peritoneal cancer, malignant pleural mesothelioma, biliary tract cancer (e.g., gallbladder cancer, bile duct cancer and nipple cancer), skin cancer (e.g., uveal melanoma and Merkel cell carcinoma), testicular cancer (germ cell tumor), vaginal cancer, vulvar cancer, penile cancer, small intestine cancer, endocrine system cancer, thyroid gland cancer, parathyroid cancer, adrenal cancer, spinal tumor, neuroblastoma, medulloblastoma, retinoblastoma, neuroendocrine tumor, brain tumor (e.g., glioma (e.g., glioblastoma and gliosarcoma) and meningioma) and squamous cell carcinoma;

[49] the agent according to the preceding item [47], wherein the cancer is solid cancer and the solid cancer is bone and soft tissue sarcoma (e.g., Ewing sarcoma, pediatric rhabdomyosarcoma, uterine leiomyosarcoma, chondrosarcoma, lung sarcoma, osteosarcoma and congenital fibrosarcoma) or Kaposi's sarcoma;

[50] the agent according to the preceding item [47], wherein the cancer is hematological cancer, and the hematological cancer is one or more cancers selected from multiple myeloma, malignant lymphoma (e.g., non-Hodgkin lymphoma (e.g., follicular lymphoma, diffuse large B-cell lymphoma, MALT lymphoma, mycosis fungoides, Sezary syndrome, chronic or acute lymphocytic leukemia, peripheral T-cell lymphoma, extranodal NK/T-cell lymphoma, adult T cell leukemia, B-cell lymphoblastic leukemia, T-cell lymphoblastic leukemia and lymphoplasmacytic lymphoma) and Hodgkin lymphoma (e.g., classical Hodgkin lymphoma and nodular lymphocyte-predominant Hodgkin lymphoma)), leukemia (e.g., acute myelogenous leukemia and chronic myelogenous leukemia), central nervous system primary malignant lymphoma, myelodysplastic syndromes and myeloproliferative syndromes;

[51] the agent according to the preceding items [1] to [46], wherein the cancer is pediatric cancer or primary unknown cancer;

[52] the agent according to the preceding item [47], wherein the cancer is solid cancer, and the solid cancer is pancreatic cancer or biliary tract cancer;

[53] the agent according to the preceding item [47], wherein the cancer is solid cancer, and where solid cancer is pancreatic cancer;

[54] the agent according to the preceding item [53], wherein the pancreatic cancer is pancreatic ductal cancer, insulinoma or intraductal papillary mucinous neoplasm;

[55] the agent according to any one of the preceding items [1] to [54], which is against cancer on which the therapeutic effect of anti-cancer drug is insufficient or not sufficient;

[56] the agent according to any one of the preceding items [1] to [55], which is against cancer which became worse after treatment with anti-cancer drug;

[57] the agent according to any one of the preceding items [1] to [54], which is for a patient with cancer which has not been previously treated with any anti-cancer drugs;

[58] the agent according to any one of the preceding items [1] to [57], which is against incurable or unresectable, metastatic, recurrent, refractory and/or distant metastatic cancer;

[59] the agent according to any one of the preceding items [1] to [46], which is for a patient with distant metastatic pancreatic cancer which has not previously treated with any of anti-cancer drugs;

[60] the agent according to any one of the preceding items [55] to [57] and [59], wherein the anti-cancer drug is one or more drugs selected from an alkylating agent, platinum preparation, antimetabolite (e.g., antifolate, pyridine metabolism inhibitor and purine metabolism inhibitor), ribonucleotide reductase inhibitor, nucleotide analog, topoisomerase inhibitor, microtubule polymerization inhibitor, microrubule depolymerization inhibitor, antitumor antibiotic, cytokine preparations, anti-hormonal drug, molecular targeting drug and cancer immunotherapeutic drug;

[61] the agent according to any one of the preceding items [1] to [60], which is against cancer of which the percentage of PD-L1 expressing tumor cells among tumor cells in tumor tissue ("Tumor Proportion Score": hereinafter, abbreviated as "TPS") is 50% or more, 25% or more, 10% or more, 5% or more or 1 % or more;

[62] the agent according to any one of the preceding items [1] to [60], which is against cancer of which TPS is less than 50%, less than 25%, less than 10%, less than 5% or less than 1%;

[63] the agent according to any one of the preceding items [1] to [60], which is against cancer of which the numerical value obtained by dividing the total number of PD-L1 positive cells among tumor cells, lymphocytes and macrophages in tumor tissue by the total number of tumor cells in the tumor tissue and multiplying by 100 ("Combined Positive Score": hereinafter, abbreviated as "CPS") is 20% or more, 10% or more, 5% or more or 1% or more;

[64] the agent according to any one of the preceding items [1] to [60], which is against cancer of which CPS is less than 20%, less than 10%, less than 5% or less than 1%;

[65] the agent according to any one of the preceding items [1] to [64], which is against cancer with high-frequency microsatellite instability (hereinafter, abbreviated as "MSI-H") and/or deficient mismatch repair (hereinafter, abbreviated as "dMMR");

[66] the agent according to any one of the preceding items [1] to [64], which is against cancer without MSI-H and/or dMMR or with low-frequency microsatellite instability (hereinafter abbreviated as "MSI-L");

[67] the agent according to any one of the preceding items [1] to [66], which is against cancer of which tumor mutation burden (hereinafter, abbreviated as "TMB") is high frequency (the number of mutations per $10^6$ bases is 10 or more);

[68] the agent according to any one of the preceding items [1] to [66], which is against cancer of which TMB is low frequency (the number of mutations per $10^6$ bases is less than 10);

[69] the agent according to any one of the preceding items [1] to [68], which is administered in combination with only FFX therapy or a dose-reducing regimen thereof;

[70] the agent according to any one of the preceding items [1] to [68], which is not prescribed in combination with radiation therapy;

[71] the agent according to any one of the preceding items [1] to [68], which is not prescribed as preoperative therapy;

[72] the agent according to any one of the preceding items [1] to [68], which is further prescribed in combination with other anti-cancer drugs;

[73] the agent according to the preceding item [72], wherein the anti-cancer drug is one or more drugs selected from an alkylating agent, platinum preparation, antimetabolite (e.g., antifolate, pyridine metabolism inhibitor and purine metabolism inhibitor), ribonucleotide reductase inhibitor, nucleotide analog, topoisomerase inhibitor, microtubule polymerization inhibitor, microtubule depolymerization inhibitor, antitumor antibiotic, cytokine preparations, anti-hormonal drug, molecular targeting drug and cancer immunotherapeutic drug;

[74] an agent for suppressing the progression of, suppressing the recurrence of and/or treating pancreatic cancer, containing Nivolumab as an active ingredient, which is characterized by being administered only in combination with a dose-reducing regimen of FFX therapy, wherein Nivolumab is intravenously administered at 480 mg per dose over 30 minutes every 4 weeks and in the dose-reducing regimen, L-OHP is intravenously administered at 85 mg/m$^2$ over 2 hours, and then l-LV is intravenously administered at 200 mg/m$^2$ over 2 hours, and 30 minutes after the start of l-LV administration, CPT-11 is intravenously administered at 150 mg/m$^2$ over 1.5 hours, and further after completion of l-LV administration, 5-FU is intravenously administered at 2400 mg/m$^2$ over 46 hours, and a series of the preceding administrations is performed every 2 weeks;

[75] the agent according to the preceding item [74], wherein the pancreatic cancer is distant metastatic and has not been previously treated with any anti-cancer drugs;

[76] the agent according to the preceding item [74] or [75], wherein in the case that the administration of Nivolumab and the dose-reducing regimen described in the preceding item [74] are prescribed on the same day, Nivolumab is initially administered, and at least about 30 minutes after completion of administration of Nivolumab, the dose-reducing regimen is started;

[77] the agent according to any one of the preceding items [74] to [76], wherein the administration of immune CP inhibitory substance and the dose-reducing regimen described in the preceding item [74] are initially prescribed on the same day;

[1-1] an immune CP inhibitory substance or immune CP inhibitor for use in suppressing the progression of, suppressing the recurrence of and/or treating cancer, which is administered in combination with FFX therapy or a dose-reducing regimen thereof;

[2-1] use of an immune CP inhibitory substance in manufacturing an agent for suppressing the progression of, suppressing the recurrence of and/or treating cancer, which is administered in combination with FFX therapy or a dose-reducing regimen thereof; and

[3-1] a method for suppressing the progression of, suppressing the recurrence of and/or treating cancer, comprising prescribing FFX therapy or a dose-reducing regimen thereof, and an immune CP inhibitory substance or immune CP inhibitor to a patient.

The present specification includes the disclosure content of Japanese Patent Application No. 2018-220866, which is the basis of priority of the present application.

Advantage Effects of Invention

The present invention provides a new therapy for cancers difficult to treat by existing therapies.

DESCRIPTION OF EMBODIMENTS

The "immune checkpoint inhibitor" in the present specification means, for example, a drug containing a substance inhibiting immune checkpoint such as an anti-PD-1 antibody (e.g., Nivolumab, Cemiplimab (REGN-2810), Pembrolizumab (MK-3475), Spartalizumab (PDR-001), Tislelizumab (BGB-A317), AMP-514 (MEDI0680), Dostarlimab (ANB011/TSR-042), Tripalimab (JS001), Camrelizumab (SHR-1210), Genolimzumab (CBT-501), Sintilimab (IBI308), STI-A1110, ENUM 388D4, ENUM 244C8, GLS010, MGA012, AGEN2034, CS1003, HLX10, BAT-1306, AK105, AK103, BI 754091, LZM009, CMAB819, Sym021, GB226, SSI-361, JY034, HX008, ISU106, ABBV181, BCD-100, PF-06801591, CX-188, JNJ-63723283 and AB122, etc.), anti-PD-L1 antibody (e.g., Atezolizumab (RG7446/MPDL3280A), Avelumab (PF-06834635/MSB0010718C), Durvalumab (MEDI4736), BMS-936559, STI-1014, KN035, LY3300054, HLX20, SHR-1316, CS1001 (WBP3155), MSB2311, BGB-A333, KL-A167, CK-301, AK106, AK104, ZKAB001, FAZ053, CBT-502 (TQB2450), JS003 and CX-072, etc.), anti-CTLA-4 antibody (e.g., Ipilimumab (MDX-010), AGEN1884 and Tremelimumab, etc.) and the like, as an active ingredient.

Nivolumab can be produced according to the method described in WO2006/121168, Pembrolizumab can be produced according to the method described in WO2008/156712, and BMS-936559 can be produced according to the method described in WO2007/005874, and Ipilimumab can be produced according to the method described in WO2001/014424.

In therapy of the present invention, the immune CP inhibitory substances are preferably the anti-PD-1 antibody, anti-PD-L1 antibody and anti-CTLA-4 antibody, and the anti-PD-1 antibodies are preferably Nivolumab, Cemiplimab, Pembrolizumab, Spartalizumab, Tislelizumab, Tripalimab, Sintilimab and Camrelizumab, and the anti-PD-L1 antibodies are preferably Atezolizumab, Avelumab, Durvalumab and BMS-936559, and the anti-CTLA-4 antibodies are preferably Ipilimumab and Tremelimumab. Further, the anti-PD-1 antibodies are more preferably Nivolumab, Cemiplimab and Pembrolizumab, and furthermore preferably Nivolumab.

"FFX therapy" in the present invention means a cancer therapy by a combination of 4 drugs comprising oxaliplatin (L-OHP), irinotecan hydrochloride hydrate (CPT-11), levofolinate calcium (l-LV) and fluorouracil (5-FU), in which L-OHP is intravenously administered at 85 mg/m$^2$ over 2 hours, and then l-LV is intravenously administered at 200 mg/m$^2$ over 2 hours, and 30 minutes after the start of l-LV administration, CPT-11 is intravenously administered at 180 mg/m$^2$ over 1.5 hours, and further after completion of l-LV administration, 5-FU is rapidly intravenously administered at 400 mg/m$^2$, and furthermore 5-FU is administered intravenously at 2400 mg/m$^2$ over 46 hours, and a series of the preceding administrations is performed every 2 weeks.

The "dose-reducing regimen" of FFX therapy means a prescription to reduce the dose of any of four drugs administered in FFX therapy from the initial administration or discontinue the administration itself, or to reduce the dose in any of administrations during the second or subsequent cycles or discontinue any of administrations of four drugs, depending on the degree of side effect observed in any of administrations during the first or subsequent cycles. As an embodiment, for example, 5-FU needs not to be rapidly, intravenously administered from the initial administration, and the dose of L-OHP may be about 65 mg/m$^2$, about 50 mg/m$^2$ or an arbitrary dose between about 85 and about 50 mg/m$^2$, the dose of CPT-11 may be about 150 mg/m$^2$, about 120 mg/m$^2$, about 90 mg/m$^2$ or an arbitrary dose between about 180 and about 90 mg/m$^2$ and the dose of 5-FU to continuously, intravenously be administered may be about 1800 mg/m$^2$, about 1200 mg/m$^2$ or an arbitrary dose between about 2400 and about 1200 mg/m$^2$.

Further, as another embodiment of the dose-reducing regimen, in any of administrations during the second and subsequent cycles of FFX therapy, depending on the degree of side effect in a patient, rapid intravenous administration of 5-FU may be discontinued. Depending on the degree of side effect in a patient, the dose of L-OHP is reduced to about 65 mg/m$^2$, about 50 mg/m$^2$ or an arbitrary dose between about 85 and about 50 mg/m$^2$, or L-OHP administration may be discontinued, and depending on the degree of side effect in a patient, the dose of CPT-11 may be reduced to about 150 mg/m$^2$, about 120 mg/m$^2$, about 90 mg/m$^2$ or an arbitrary dose between about 180 and about 90 mg/m$^2$, or CPT-11 administration may be discontinued, and depending on the degree of side effect in a patient, the dose of 5-FU to be continuously, intravenously administered maybe reduced to about 1800 mg/m$^2$, about 1200 mg/m$^2$ or an arbitrary dose between about 2400 and about 1200 mg/m$^2$, or 5-FU administration may be discontinued.

In Examples of the present specification, irinotecan hydrochloride hydrate may be simply abbreviated as "irinotecan", and similarly, levofolinate calcium may be simply abbreviated as "levofolinate".

In another embodiment of the dose-reducing regimen, L-OHP may be intravenously administered at 85 mg/m$^2$ over 2 hours, and then l-LV may be intravenously administered at 200 mg/m$^2$ over 2 hours, and 30 minutes after the start of l-LV administration, CPT-11 may be intravenously administered at 150 mg/m$^2$ over 1.5 hours, and further after completion of l-LV administration, 5-FU may be intravenously administered at 2400 mg/m$^2$ over 46 hours, and a series of the preceding administrations may be performed every 2 weeks, in particular, the dose-reducing regimen is recognized as modified FOLFIRINOX therapy (mFFX therapy).

As an additional dose-reducing regimen of mFFX therapy, for example, from the initial administration, the dose of L-OHP may be about 65 mg/m$^2$, about 50 mg/m$^2$ or an arbitrary dose between about 85 and about 50 mg/m$^2$, the dose of CPT-11 may be about 120 mg/m$^2$, about 90 mg/m$^2$ or an arbitrary dose between about 150 and about 90 mg/m$^2$ and the dose of 5-FU to continuously, intravenously be administered may be about 1800 mg/m$^2$, about 1200 mg/m$^2$ or an arbitrary dose between about 2400 and about 1200 mg/m$^2$.

Further, in any of administrations during the second and subsequent cycles of mFFX therapy, depending on the degree of side effect in a patient, the dose of L-OHP may be reduced to about 65 mg/m$^2$, about 50 mg/m$^2$ or an arbitrary dose between about 85 and about 50 mg/m$^2$, or L-OHP administration may be discontinued, and depending on the degree of side effect in a patient, the dose of CPT-11 may be reduced to about 120 mg/m$^2$, about 90 mg/m$^2$ or an arbitrary dose between about 150 and about 90 mg/m$^2$, or CPT-11 administration may be discontinued, and depending on the degree of side effect in a patient, the dose of 5-FU to be continuously, intravenously administered may be reduced to about 1800 mg/m$^2$, about 1200 mg/m$^2$ or an arbitrary dose between about 2400 and about 1200 mg/m$^2$, or 5-FU administration may be discontinued.

Furthermore, a series of dosage intervals in FFX therapy, mFFX therapy, or dose-reducing regimens thereof may be temporarily or continuously set to 3 weeks or 4 weeks, depending on the degree of side effect in a patient.

In the present specification, "radiation therapy" means a therapy to irradiate radiation to kill cancer cells, and examples thereof include intensity-modulated radiation therapy (IMRT), image-guided radiation therapy (IGRT), stereotactic radiation therapy (SRT), stereotactic body radiation therapy (SBRT), stereotactic surgery (SRS), proton beam therapy, heavy ion beam therapy, brachytherapy and the like.

In the present specification, "preoperative therapy" means a preceding therapy with an anti-cancer drug or the like prior to surgery, and is mainly performed for the purpose of preventing postoperative micrometastases of invasive cancer and preventing the recurrence.

In the present specification, the "agent in the present invention" or "agent of the present invention" includes, in addition to the immune CP inhibitor, drugs containing oxaliplatin, irinotecan hydrochloride hydrate, levofolinate calcium and fluorouracil, respectively, as an active ingredient, used in FFX therapy, mFFX therapy or dose-reducing regimens thereof. Further, the "therapy in the present invention" or "therapy of the present invention" in the present specification means a combinational therapy of the immune CP inhibitor and FFX therapy, mFFX therapy, or a dose-reducing regimen thereof for a patient with cancer.

In the present specification, "about" means that the numerical value may be changed within the range of 10% or less or above.

Applicable Diseases and Patients

The agent or therapy of the present invention can be applied to all solid cancers and hematological cancers. Examples of solid cancers include malignant melanoma (e.g., malignant melanoma in skin, oral cavity, mucosal epithelium or orbit, etc.), non-small cell lung cancer (e.g., squamous non-small cell lung cancer and non-squamous non-small cell lung cancer), small cell lung cancer, head and neck cancer (e.g., oral cancer, nasopharynx cancer, oropharyngeal cancer, hypopharyngeal cancer, laryngeal cancer, nasopharyngeal cancer, salivary gland cancer and tongue cancer), renal cell cancer (e.g., clear cell renal cell cancer), breast cancer, ovarian cancer (e.g., serous ovarian cancer and ovarian clear cell adenocarcinoma), uterine cancer (e.g., cervical cancer and endometrial cancer), anal cancer (e.g., anal canal cancer), colorectal cancer, rectal cancer, colon cancer, hepatocellular carcinoma, esophageal cancer, gastric cancer, esophagogastric junction cancer, pancreatic cancer (e.g., pancreatic duct cancer, insulinoma and intraductal papillary mucinous neoplasm), urine urothelial cancer (e.g., bladder cancer, upper urinary tract cancer, ureteral cancer, renal pelvis and urethral cancer), prostate cancer, fallopian tube cancer, primary peritoneal cancer, malignant pleural mesothelium tumor, biliary tract cancer (e.g., gallbladder cancer, bile duct cancer and papillary cancer), skin cancer (e.g., uveal melanoma and Merkel cell carcinoma), testicular cancer (germ cell tumor), vagina cancer, vulvar cancer, penile cancer, small intestine cancer, endocrine system cancer, thyroid cancer, parathyroid cancer, adrenal cancer, spinal tumor, neuroblastoma, medulloblastoma, retinoblastoma, neuroendocrine tumor, brain tumor (e.g., gliomas (e.g., glioblastoma and gliosarcoma) and meningioma), squamous cell carcinomas and the like.

Further, among solid cancers, examples of sarcomas include bone and soft tissue sarcomas (e.g., Ewing sarcoma, childhood rhabdomyosarcoma, uterine leiomyosarcoma, chondrosarcoma, lung sarcoma, osteosarcoma, congenital fibrosarcoma), Kaposi's sarcoma and the like.

Examples of hematological cancers include multiple myeloma, malignant lymphoma (e.g., non-Hodgkin's lymphoma (e.g., follicular lymphoma, diffuse large B-cell lymphoma, MALT lymphoma, lymphoplasmic cell lymphoma, mycosis fungoides, Sézary syndrome, chronic or acute lymphocytic leukemia, peripheral T-cell lymphoma, extranodal NK/T-cell lymphoma, adult T-cell leukemia, B-cell lymphoblastic leukemia, T-cell lymphoblastic leukemia and lymphoid plasma cell lymphoma) and Hodgkin lymphoma (e.g., classic Hodgkin lymphoma and nodular lymphocyte-predominant Hodgkin lymphoma)) and leukemia (e.g., acute myelogenous leukemia and chronic myelogenous leukemia), central nervous system malignant lymphoma, myelodysplastic syndrome, myeloproliferative syndrome and the like Furthermore, examples of cancers to which the drug or therapy of the present invention is applied include pediatric cancer and unknown primary cancer.

Cancer to which the drug or therapy of the present invention is applied is preferably pancreatic cancer and biliary tract cancer, and pancreatic cancer is preferably pancreatic duct cancer, insulinoma, which is neuroendocrine tumor, and intraductal papillary mucinous neoplasm In the present specification, examples of "therapies" for cancer include, for example, one which is performed (i) to reduce the proliferation of tumor cells, (ii) to reduce the symptoms caused by cancer, (iii) improve the quality of life of patients with cancer, (iv) to reduce the dose of other anti-cancer drugs or adjunctive drugs for cancer therapy which have already been administered, and/or (v) to prolong the survival of patients with cancer. The term "suppressing the progression" of cancer means delaying the progression of cancer, stabilizing the symptoms associated with cancer, and slowing the progression of symptoms. In addition, the term "suppressing the recurrence of cancer" means prophylactically deterring cancer recurrence in patients whose cancer lesions have been completely or substantially eliminated or removed by cancer therapy or resection surgery.

The drug or therapy of the present invention may be prescribed to the following patients with cancer, that is, (a) patients which have insufficient or do not have sufficient therapeutic effect of an anti-cancer drug, or patients which have become worse after treatment with an anti-cancer drug, (b) patients with incurable or unresectable, metastatic, recurrent, refractory and/or distant metastatic cancer (c) patients with cancer having 50% or more, 25% or more, 10% or more, 5% or more or 1% or mere of TPS, (d) patients with cancer having 20% or more, 10% or more, 5% or more or 1% or more of CPS, (e) patients with cancer having MSI-H and/or dMMR, (f) patients with cancer of which TMB is high frequency. On the other hand, the drug or therapy of the present invention may be needed to be prescribed to the following patients with cancer, that is, (g) patients which have not been previously treated with any anti-cancer drugs, (h) patients with cancer having less than 50%, less than 25%, less than 10%, less than 5% or less than 1% of TPS, (i) patients with cancer having less than 20%, less than 10%, less than 5% or less than 1% of CPS, (j) patients with cancer which do not have MSI-H and/or dMMR, or which have MSI-L, or (k) patients with cancer which TMB is low frequency. In particular, examples of patients with cancer for which the drug or therapy of the present invention is required include patients with cancer which have not been previously treated with any anti-cancer drugs and/or is distant metastatic, and particularly patients with pancreatic cancer. Here, examples of the "anti-cancer drugs" include, for example, an alkylating drug, platinum preparation, antimetabolite (e.g., antifolate, pyridine metabolism inhibitor, purine metabolism inhibitor), ribonucleotide reductase inhibitor, nucleotide analogues, topoisomerase inhibitor, microtubule polymerization inhibitor, microtubule depolymerization inhibitor, anti-tumor antibiotics, cytokine preparation, anti-hormonal drug, molecular targeting drug and cancer immunotherapeutic drug and each drug classified into them. Examples include, for example, each drug listed in the item [Combination] below and oxaliplatin, irinotecan hydrochloride hydrate, levofolinate calcium, fluorouracil and drugs classified into immune CP inhibitors. In general, the "anti-cancer drug" is used as a synonym for "chemotherapeutic drug".

Prescription

The immune CP inhibitor of the present invention can be administered in the following usage and dosage in combination with FFX therapy, mFFX therapy, or a dose-reducing regimen thereof.

For example, as an active ingredient of the immune CP inhibitor, it can be intravenously administered (e.g., intravenous drip) at about 1 to 10 mg/kg (body weight) per dose or about 200 to 1200 mg per dose, every 2 to 4 week, over about 30 minutes to about 60 minutes or about 60 minutes or more. Herein, examples of the single dose based on body weight include, for example, 1 mg/kg, 2 mg/kg, 3 mg/kg, 4 mg/kg, 5 mg/kg, 6 mg/kg, 7 mg/kg, 8 mg/kg, 9 mg/kg or 10 mg/kg, while examples of the single dose include, for example, 200 mg, 240 mg, 250 mg, 280 mg, 300 mg, 320 mg, 350 mg, 360 mg, 400 mg, 420 mg, 450 mg, 480 mg, 500 mg, 540 mg, 560 mg, 600 mg, 640 mg, 700 mg, 720 mg, 750 mg, 800 mg, 840 mg, 900 mg, 1000 mg, 1080 mg, 1100 mg, 1120 mg or 1200 mg. Examples of the dosage intervals include, for example, 2 weeks, 3 weeks or 4 weeks, and examples of the single dosing time include, for example, about 30 minutes, about 60 minutes or about 60 minutes or more.

When the active ingredient is Nivolumab, which is an anti-PD-1 antibody, it is administered at the following dosage, that is, to patients with malignant melanoma, Nivolumab is administered at 3 mg/kg (body weight) per dose every 2 weeks or 2 mg/kg (body weight) per dose every 3 weeks, by intravenous drip infusion and to each patient with non-small cell lung cancer, renal cell carcinoma, classic Hodgkin's lymphoma, head and neck cancer, gastric cancer and malignant pleural mesothelioma, Nivolumab is administered at 3 mg/kg (body weight) per dose every 2 weeks by intravenous drip infusion. As another usage and dosage, for example, to each patient with malignant melanoma, non-small cell lung cancer, renal cell carcinoma, urothelial cancer, MSI-H or dMMR-positive colorectal cancer (including pediatric patients aged 12 years or older), gastric cancer, hepatocellular carcinoma, small cell lung cancer and malignant pleural mesothelioma, Nivolumab is administered at 240 mg per dose every 2 weeks or 480 mg per dose every 4 weeks by intravenous drip infusion. Further, as one more usage and dosage, for example, to patients with malignant melanoma, in combination with Ipilimumab, Nivolumab may be administered at 1 mg/kg (body weight) per dose four times every 3 weeks by intravenous drip infusion, and then Nivolumab may be administered at 3 mg/kg (body weight) per dose every 2 weeks by intravenous drip infusion, or Nivolumab may be administered at 80 mg per dose four times every 3 weeks, then Nivolumab is administered at 240 mg per dose every 2 weeks by intravenous drip infusion. In addition, for example, to patients with renal cell carcinoma, in combination with Ipilimumab, Nivolumab is administered at 240 mg per dose four times every 3 weeks by intravenous drip infusion, and then Nivolumab is administered at 240 mg per dose every 2 weeks by intravenous drip infusion. In the case of Pembrolizumab, which is the same anti-PD-1 antibody, it is administered at the following dosage, that is, to each patients with malignant melanoma, non-small cell lung cancer, classical Hodgkin lymphoma, head and neck cancer, MSI-H or dMMR-positive solid cancer or colorectal cancer, urothelial cancer, cervical cancer, primary mediastinal B-cell lymphoma, hepatocellular carcinoma, gastric cancer and Merkel cell carcinoma. Pembrolizumab is administered at 200 mg per dose every 3 weeks by intravenous drip infusion. As another usage and dosage, for example, to each patient with pediatric classic Hodgkin lymphoma, aged 2 years or older, MSI-H or dMMR-positive solid cancer or colorectal cancer and primary mediastinal B-cell lymphoma, Pembrolizumab is administered at 2 mg/kg (body weight) per dose (up to 200 mg per dose) every 3 weeks by intravenous drip infusion.

In addition, when the active ingredient is Avelumab, which is an anti-PD-L1 antibody, to each patient with Merkel cell carcinoma and urothelial carcinoma, Avelumab is administered at 10 mg/kg (body weight) per dose every 2 weeks by intravenous drip infusion. It the case of Atezolizumab, which is the same anti-PD-L1 antibody, to each patient with non-small cell lung cancer and urothelial cancer, Atezolizumab is administered at 1200 mg per dose every 3 weeks by intravenous drip infusion, and to patients with triple negative breast cancer, in combination with paclitaxel, Atezolizumab is administered at 840 mg per dose every 2 weeks by intravenous drip infusion. Furthermore, Durvalumab, which is the same PD-L1 antibody, Durvalumab is administered to each patient with non-small cell lung cancer and urothelial cancer at 10 mg/kg (body weight) per dose every 2 weeks by intravenous drip infusion.

In the case of Ipilimumab, which is an anti-CTLA-4 antibody, Ipilimumab is administered to patients with malignant melanoma at 3 mg/kg (body weight) per dose daily four times every 3 weeks alone or in combination with Nivolumab, by intravenous drip infusion, and to each patient with renal cell carcinoma and MSI-H or dMMR-positive colorectal cancer, in combination with Nivolumab, Ipilimumab is administered at 1 mg/kg (body weight) per dose daily four times every 3 weeks by intravenous drip infusion.

Intravenous drip infusion is preferable as an administration form for intravenous administration of these immune CP inhibitors.

On the other hand, in FFX therapy, in combination with the immune CP inhibitor exemplified above, L-OHP is intravenously administered at 85 mg/m$^2$ over 2 hours and then l-LV is intravenously administered at 200 mg/m$^2$ over 2 hours, 50 minutes after the start of l-LV administration, CPT-11 is intravenously administered at 180 mg/m$^2$ of over 1.5 hours, and after completion of l-LV administration, 5-FU is rapidly, intravenously administered at 400 mg/m$^2$, and furthermore, 5-FU is continuously, intravenously administered at 2400 mg/m$^2$ over 46 hours, wherein a series of the preceding administrations can be performed every 2 weeks. In addition, 5-FU needs not to be rapidly, intravenously administered from the initial administration, and further each dose of L-OHP, CPT-11 and/or 5-FU which is continuously, intravenously administered may be set as described above. Furthermore, in any of administrations during the second and subsequent cycles, rapid intravenous administration of 5-FU may be stopped, depending on the degree of side effect in a patient, and each dose of L-OHP, CPT-11 and/or 5-FU which is continuously intravenously administered may be reduced as described above, or each administration itself may be discontinued, depending on the degree of side effect in a patient.

In mFFX therapy, in combination with the immune CP inhibitor exemplified above, L-OHP is intravenously administered at 85 mg/m² over 2 hours, and then l-LV can be intravenously administered at 200 mg/m² over 2 hours, 30 minutes after the start of l-LV administration, CPT-11 can be intravenously administered at 150 mg/m² over 1.5 hours, and after completion of l-LV administration, 5-FU can be administered at 2400 mg/m² over 46 hours. Further, each dose of L-OHP, CPT-11 and/or 5-FU which is continuously intravenously administered may be set as described above from initial administration. Furthermore, in any of administrations during the second and subsequent cycles, each dose of L-OHP, CPT-11 and/or 5-FU which is continuously intravenously administered may be reduced as described above, or each administration itself may be discontinued, depending on the degree of side effect in a patient.

A series of dosage intervals in FFX therapy, mFFX therapy, or dose-reducing regimens thereof may be temporarily or continuously set to 3 weeks or 4 weeks, depending on the degree of side effect in a patient.

In a combinational prescription of the immune CP inhibitor of which an active ingredient is Nivolumab and mFFX therapy, Nivolumab is intravenously administered (e.g., intravenous drip infusion) at 3 mg/kg (body weight) per dose or 240 mg per dose every 2 weeks, or 480 mg per dose every 4 weeks over 30 minutes or 60 minutes while in mFFX therapy, L-OHP can be intravenously administered at 85 mg/m² over 2 hours, and then l-LV can be intravenously administered at 200 mg/m² over 2 hours, 30 minutes after the start of l-LV administration, CPT-11 can be intravenously administered at 150 mg/m² over 1.5 hours, and after completion of l-LV administration, 5-FU can be intravenously administered at 2400 mg/m² over 46 hours wherein a series of the preceding administrations can be performed every 2 weeks. Further, as a prescription of Nivolumab in the same combination, a method in which Nivolumab is intravenously administered (e.g., intravenous drip infusion) at 480 mg per dose every 4 weeks over 30 minutes is preferable.

In addition, when the administration of the immune CP inhibitor and FFX therapy, mFFX therapy, or dose-reducing regimens thereof, as exemplified above, are performed on the same day, it is preferred that the immune CP inhibitor is initially administered, and at least about 30 minutes after completion of the administration of the immune CP inhibitor, FFX therapy, mFFX therapy or dose-reducing regimens thereof starts. Further, it is preferred that in the same combination, the therapy of the present invention is initially started by the administration of the immune CP inhibitor and FFX therapy, mFFX therapy, or dose-reducing regimens thereof on the same day.

Combination

The drug or therapy of the present invention may be used in combination with one or more other drugs (e.g., anti-cancer drugs, antiemetic drugs) used for the purpose of cancer therapy in order to (1) suppress the progression of cancer and/or enhancing the therapeutic effect, (2) reduce the dose of other drugs used in combination, and/or (3) reduce side effects of other drugs used in combination. In the present invention, the dosage form in the case of prescription in combination with other drugs may be in the form of combination preparation in which other drug is mixed in any one preparation of the present invention, or the form which is administered as separated preparations. Here, the dose of other drugs can be appropriately selected based on the dose clinically used. In addition, other drugs may be administered in combination of arbitrary two or more kinds at appropriate ratio. Further, the above-mentioned other drugs include not only those which have been found up to now but those which will be found in the future.

"Other anti-cancer drugs" which can be listed as a major example of other drugs are anti-cancer drugs except oxaliplatin, irinotecan hydrochloride hydrate, levofolinate calcium and fluorouracil, and examples thereof include, for example, an alkylating drug (e.g., Dacarbazine, Nimustine, Temozolomide, Fotemustine, Bendamustine, Cyclophosphamide, Ifosfamide, Carmustine, Chlorambucil and Procarbazine, etc.), platinum preparation (e.g., Cisplatin, Carboplatin, and Nedaplatin), antimetabolite (e.g., antifolate (e.g., Pemetrexed, Leucovorin and Methotrexate, etc.), pyridine metabolism inhibitor (e.g., TS-1 (registered trademark), 5-fluorouracil, UFT, Carmofur, Doxifuridine, FdUrd, Cytarabine and Capecitabine, etc.), purine metabolism inhibitor (e.g., Fludarabine, Cladribine and Nelarabine, etc.)), ribonucleotide reductase inhibitor, nucleotide analogs (e.g., Gemcitabine)), topoisomerase inhibitor (e.g., Nogitecan and Etoposide, etc.), microtubule polymerization inhibitor (e.g., Vinblastine, Vincristine, Vindesine, Vinorelbine and Eribulin, etc.), microtubule depolymerization inhibitor (e.g., Docetaxel and Paclitaxel), antitumor antibiotics (e.g., Bleomycin, Mitomycin C, Doxorubicin, Daunorubicin, Idarubicin, Etoposide, Mitoxantrone, Vinblastine, Vincristine, Peplomycin, Amrubicin, Aclarubicin and Epirubicin, etc.), cytokine preparation (e.g., IFN-α2a, IFN-α2b, peg IFN-α2b, natural IFN-β and Interleukin-2, etc.), anti-hormonal drug (e.g., Tamoxifen, Fulvestrant, Goserelin, Leuprorelin, Anastrozole, Letrozole and Exemestane, etc.), molecular targeting drug, cancer immunotherapeutic drug and other antibody drug.

Herein, examples of molecular targeting agents which can be listed as other anti-cancer agents include, for example, an ALK inhibitor (e.g., Crizotinib, Ceritinib, Ensartinib, Alectinib and Lorlatinib), BCR-ABL inhibitor (e.g., Imatinib and Dasatinib), EGFR inhibitor (e.g., Erlotinib, EGF816, Afatinib, Osimertinib mesilate, Gefitinib and Rociletinib), B-Raf inhibitor (e.g., Sorafenib, Vemurafenib, TAK-580, Dabrafenib, Encorafenib, LXH254, Emurafenib and BGB-3111), VEGFR inhibitor (e.g., Bevacizumab, Apatinib, Lenvatinib, Aflibercept and Axitinib), FGFR inhibitor (e.g., AZD4547, B-701, FGF401 and INCB054828), c-Met inhibitor (e.g., Savolitinib, Merestinib, Capmatinib, INC280 and Glesatinib), Axl inhibitor (e.g., ONO-7475 and BGB324), Mek inhibitor (e.g., Cobimetinib, Binimetinib, Selumetinib and Trametinib), CDK inhibitor (e.g., Dinaciclib, Abemaciclib, Palbociclib and Trilaciclib), Btk inhibitor (e.g., ONO-4059, Ibrutinib and Acalabrutinib), PI3K-δ/γ inhibitor (e.g., TGR-1202, INCB050465 and IPI-549), JAK-1/2 inhibitor (e.g., Itacitinib and Ruxolitinib), ERK inhibitor (e.g., SCH 900353), TGFbR1 inhibitor (e.g., Galunisertib), Cancer cell stemness kinase inhibitor (e.g., Amcasertib), FAK inhibitor (e.g., Defactinib), Syk/FLT3 dual inhibitor (e.g., TAK-659), ATR inhibitor (e.g., AZD6738), Weel kinase inhibitor (e.g., AZD1775)), multi-tyrosine kinase inhibitor (e.g., Sunitinib, Pazopanib, Cabozantinib, Regorafenib, Nintedanib, Sitravatinib and Midostaurin), mTOR inhibitor (e.g., Temsirolimus, Everolimus, and Vistusertib), HDAC inhibitor (e.g., Vorinostat, Romideps, Entinostat, Chidamide, Mocetinostat, Citarinostat, Panobinostat and Valproate), PARP inhibitor (e.g., Niraparib, Olaparib, Veliparib, Rucaparib and Beigene-290), aromatase inhibitor (e.g., Exemestane and Letrozole), EZH2 inhibitor (e.g., Tazemetostat), Galectin-3 inhibitors (e.g., GR-MD-02), STAT3 inhibitor (e.g., Napabucasin), DNMT inhibitor (e.g., Azacitidine), SMO inhibitor (e.g., Vismodegib), Hsp90 inhibitor (e.g., XL888), γ-tubulin specific inhibitor (e.g., Glaziovianin A and Plinabulin), HIF2α inhibitor (e.g., PT2385), Glutaminase inhibitor (e.g., CB-839), E3 ligase inhibitor (e.g., Avadomide), Nrf2 activator (e.g., Omaveloxolone), arginase inhibitor (e.g., CB-1158), cell cycle inhibitor (e.g., Trabectedin), Ephrin B4 inhibitor (e.g., sEphB4-HAS), IAP antagonist (e.g., Birinapant), anti-Her2 antibody (e.g., Trastuzumab, Trastuzumab emtansine, Pertuzumab and Margetuximab), anti-EGFR antibody (e.g., Cetuximab, Panitumumab, Necitumumab and Nimotuzumab), Anti-VEGF antibody (e.g., Bevacizumab), anti-VEGFR2 antibody (e.g., Ramucirumab), anti-CD20 antibody (e.g., Rituximab, Ofatumumab, Ublituximab and Obinutuzumab), anti-CD30 antibody (e.g., Brentuximab vedotin), anti-CD38 antibody (e.g., Daratumumab), anti-DR5 antibody (e.g., DS-8273a), anti-CA125 antibody (e.g., Oregovomab), anti-DLL4 antibody (e.g., Demcizumab), anti-fucosyl GM1 antibody (e.g., BMS-986012), anti-gpNMB antibody (e.g., Glembatumumab vedotin), anti-Mesothelin antibody (e.g., BMS-986148), anti-MMP9 antibody (e.g., Andecaliximab), anti-GD2 antibody (e.g., Dinutuximab-β), anti-c-Met antibody (e.g., ABT-399), anti-FOLR1 Antibody (e.g., Mirvetuximab soravtansine), anti-Ang2-VEGF bispecific antibody (e.g., Vanucizumab), anti-CD30-CD16A bispecific antibody (e.g., AFM13), anti-CD79b antibody (e.g., Polatuzumab vedotin), anti-FAP Antibody/IL-2 fusion protein (e.g., RO6874281), anti-CEA antibody/IL-2 fusion protein (e.g., Cergutuzumab amunaleukin), anti-CEA-CD3 bispecific antibody (e.g., RO6958688), anti-DLL3 antibody (e.g., Rovalpituzumab tesirine), anti-CD3-CD19 bispecific antibody (e.g., Blinatumomab) and anti-CD20-CD3 bispecific antibody (e.g., REGN1979) and the like.

Further, a cancer immunotherapeutic agent which can be listed as other anti-cancer agents is one having a mechanism of action different from that of any of the immune CP inhibitors of the present invention, and examples thereof include, for example, an anti-PD-1 antibody (e.g. Nivolumab, Cemiplimab (REGN-2810), Pembrolizumab (MK-3475), Spartalizumab (PDR-001), Tislelizumab (BGB-A317), AMP-514 (MEDI0680), Dostarlimab (ANB011/TSR-042), Toripalimab (JS001), Camrelizumab (SHR-1210), Genolimzumab (CBT-501), Sintilimab (IBI308), STI-A1110, ENUM 388D4, ENUM 244C8, GLS010, MGA012, AGEN2034, CS1003, BAT-1306, AK105, AK103, BI 754091, LZM009, CMAB819, Sym021, GB226, SSI-361, JY034, HX008, ISU106, ABBV181, BCD-100, PF-06801591, CX-188, JNJ-63723283 and AB122, etc.), anti-PD-L1 antibody (e.g., Atezolizumab (RG7446/MPDL3280A), Avelumab (PF-06834635/MSB0010718C), Durvalumab (MEDI4736), BMS-936559, STI-1014, KN035, LY3300054, SHR-1316, CS1001 (WBP3155), MSB2311, BGB-A333, KL-A167, CK-301, AK106, AK104, ZKAB00I, FAZ053, CBT-502 (TQB2450), JS003 and CX-072, etc.), PD-1 antagonist (e.g., AUNP-12, each compound of BMS-M1 to BMS-M10, BMS-1, BMS-2, BMS-3, BMS-8, BMS-37, BMS-200, BMS-202, BMS-230, BMS-242, BMS-1001, BMS-1166, each compound of Incyte-1 to Incyte-6, each compound of CAMC-1 to CAMC-4, RG_1 and DPPA-1, etc.), PD-L1/VISTA antagonist (e.g., CA-170 etc.), PD-L1/TIM3 antagonist (e.g., CA-327 etc.), anti-PD-L2 antibody, PD-L1 fusion protein, PD-L2 fusion protein (e.g., AMP-224 etc.), anti-CTLA-4 antibody (e.g., Ipilimumab (MDX-010), AGEN1884 and Tremelimumab, etc.), anti-LAG-3 antibody (e.g., Relatlimab (BMS-986016/ONO-4482), LAG525, REGN3767 and MK-4280, etc.), LAG-3 fusion protein (e.g., IMP321 etc.), anti-Tim3 antibody (e.g., MBG453 and TSR-022, etc.), anti-KIR antibody (e.g., Lirilumab (BMS-986015/ONO-4483), IPH2101, LY3321367 and MK-4280, etc.), anti-BTLA antibody, anti-TIGIT antibody (e.g., Tiragolumab (MTIG-7192A/RG-6058/RO-7092284) and BMS-986207 (ONO-4686)), anti-VISTA antibody (e.g., JNJ-61610588), anti-CD137 antibody (e.g., Urelumab (ONO-4481/BMS-663513) and Utomilumab (PF-05082566), etc.), anti-CSF-1R antibody or CSF-1R inhibitor (e.g., Cabiralizumab (FPA008/BMS-986227/ONO-4687), Emactuzumab (RG7155/RO5509554), LY3022855, MCS-110, IMC-CS4, AMG820, Pexidartinib, BLZ945 and ARRY-382, etc.), Anti-OX40 antibody (e.g., MEDI6469, PF-04518600, MEDI0562, MEDI6383, Efizonerimod, GSK3174998, BMS-986178 and MOXR0916, etc.), anti-HVEM antibody, anti-CD27 antibody (e.g., Varlilumab (CDX-1127) etc.), anti-GITR antibody (e.g., MK-4166, INCAGN01876, GWN323 and TRX-518, etc.), anti-CD28 antibody, anti-CCR4 antibody (e.g., Mogamulizumab etc.), anti-B7-H3 antibody (e.g., Enoblituzumab etc.), anti-ICOS agonist antibody (e.g., JTX-2011 and GSK3359609, etc.), anti-CD4 antibody (e.g., MTRX-1011A, TRX-1, Ibalizumab, huB-F5, Zanolimumab, 4162W94, Clenoliximab, Keliximab, AD-519, PRO-542, Cedlizumab, TNX-355, Dacetuzumab, Tregalizumab, Priliximab, MDX-CD4, CAMPATH-9 and IT1208, etc.), anti-DEC-205 antibody/NY-ESO-1 fusion protein (e.g., COX-1401 etc.), anti-SLAMF7 antibody (e.g., Elotuzumab etc.), anti-CD73 antibody (e.g., Oleclumab and BMS-986179, etc.), anti-CD122 antibody (e.g., NKTR-214 etc.), anti-CD40 agonist antibody (e.g., ABBV-428, APX005M and RO7009789, etc.), IDO inhibitor (e.g., Epacadostat, Indoximod, and BMS-986205, etc.), TLR agonist (e.g., Motolimod, CMP-001, G100, IMO-2125, SD-101 and MEDI9197, etc.), adenosine A2A receptor antagonist (e.g., Preladenant, AZD4635, PBF 509 and CPI-444, etc.), anti-NKG2A antibody (e.g., Monalizumab etc.), anti-CSF-1 antibody (e.g., PD0360324 etc.), immunopotentiator (e.g., PV-10 etc.), IL-15 super agonist (e.g., ALT-803 etc.)), soluble LAG3 (e.g., IMP321 etc.), CD47 antagonist (e.g., ALX148 etc.) and IL-12 antagonist (e.g., M9241 etc.) and the like.

Further, examples of other antibody drugs include, for example, anti-IL-1β antibody (e.g., Canakinumab) and anti-CCR2 antibody (e.g., Plozalizumab) and the like.

Examples of antiemetics which can be listed as a major example of other drugs include, for example, a corticosteroid (e.g., Dexamethasone and Methylprednisolone), 5-HT$_3$ receptor antagonist (e.g., Azasetron, Indisetron, Ondansetron, Granisetron, Ramosetron and Palanosetron), NK1 receptor antagonist (e.g., Aprepitant and Fosaprepitant), dopamine D$_2$ receptor antagonist (e.g., Domperidone and Metoclopramide), benzodiazepine anxiolytics (e.g., Alprazolam and Lorazepam), phenothiazine antipsychotics (e.g., Prochlorperazine and Chlorpromazine), butyrophenone antipsychotics (e.g., Haloperidol), benzisoxazole antipsychotics (e.g., Risperidone), multi-receptor antipsychotics (e.g., Olanzapine) and propylamine antihistamine (e.g., Chlorpheniramine) and the like.

Formulation

When the immune CP inhibitor of the present invention is formulated and used as an injection or drip infusion, the injection or drip infusion may be in any form of aqueous solution, suspension or emulsion. It may also be formulated as a solid preparation with a pharmaceutically acceptable carrier so that it can be dissolved, suspended or emulsified by adding a solvent at the time of use. As a solvent used for the injection or drip infusion, for example, distilled water for injection, physiological saline, glucose solution and isotonic solution (e.g., a solution such as sodium chloride, potassium chloride, glycerin, mannitol, sorbitol, boric acid, pyroborate and propylene glycol, etc.) can be used.

Here, examples of the pharmaceutically acceptable carrier include, for example, a stabilizer, solubilizing agent, suspending agent, emulsifier, soothing agent, buffer, preservative, antiseptic agent, pH adjuster and antioxidant and the like. As the stabilizer, for example, various amino acids, albumin, globulin, gelatin, mannitol, glucose, dextran, ethylene glycol, propylene glycol, polyethylene glycol, ascorbic acid, sodium bisulfite, sodium thiosulfate, sodium edetate, sodium citrate, dibutylhydroxytoluene or the like can be used. As the solubilizing agent, for example, alcohol (e.g., ethanol etc.), polyalcohol (e.g., propylene glycol, polyethylene glycol, etc.), nonionic surfactant (e.g., Polysorbate 20 (registered trademark), Polysorbate 80 (registered trademark), HCO-50, etc.) or the like can be used. As the suspending agent, for example, glyceryl monostearate, aluminum monostearate, methyl cellulose, carboxymethyl cellulose, hydroxymethyl cellulose, sodium lauryl sulfate or the like can be used. As the emulsifier, for example, gum arabic, sodium alginate, tragacanth or the like can be used. As the soothing agent, for example, benzyl alcohol, chlorobutanol, sorbitol or the like can be used. As the buffer, for example, phosphate buffer, acetate buffer, borate buffer, carbonate buffer, citrate buffer, Tris buffer, glutamate buffer, epsilon aminocaproate buffer or the like can be used. As the preservative, for example, methyl paraoxybenzoate, ethyl paraoxybenzoate, propyl paraoxybenzoate, butyl paraoxybenzoate, chlorobutanol, benzyl alcohol, benzalkonium chloride, sodium dehydroacetate, sodium edetate, boric acid, pyroborate or the like can be used. As the antiseptic agent, for example, benzalkonium chloride, paraoxybenzoic acid, chlorobutanol or the like can be used. As the pH adjuster, for example, hydrochloric acid, sodium hydroxide, phosphoric acid, acetic acid or the like can be used. As the antioxidant, for example, (1) a water-soluble antioxidant such as ascorbic acid, cysteine hydrochloride, sodium bisulfate, sodium metabisulfite, sodium sulfite and the like, (2) an oil-soluble antioxidants such as ascorbyl palmitate, butylated hydroxyanisole, butylated hydroxytoluene, lecithin, propyl gallate, α-tocopherol and the like and (3) a metal chelating agent such as citric acid, ethylenediaminetetraacetic acid, sorbitol, tartaric acid, phosphoric acid and the like can be used.

For example, in the case of the immune CP inhibitor of which the active ingredient is Nivolumab, examples of additives in a formulation thereof include, for example, D-mannitol, sodium citrate hydrate, sodium chloride, diethylenetriaminepentaacetic acid, Polysorbate 80 and pH adjuster. In the case of the immune CP inhibitor of which the active ingredient is Pembrolizumab, examples of additives in a formulation thereof include, for example, L-histidine, L-histidine hydrochloride hydrate, purified sucrose and Polysorbate 80. In the case of the immune CP inhibitor of which the active ingredient is Avelumab, examples of additives in a formulation thereof include, for example, D-mannitol, Polysorbate 20, glacial acetic acid and sodium hydroxide.

In the case of the immune CP inhibitor of the active ingredient is Atezolizumab, examples of additives in a formulation thereof include, for example, L-histidine, glacial acetic acid, purified sucrose and Polysorbate 20, and in the case of the immune CP inhibitor of which the active ingredient is Durvalumab, examples of additives in a formulation thereof include, for example, L-histidine, L-histidine hydrochloride hydrate, trehalose hydrate and Polysorbate 80. In the case of the immune CP inhibitor of which the active ingredient is Ipilimumab, examples of additives in a formulation thereof include, for example, trometamol hydrochloride, sodium chloride, D-mannitol, diethylenetriaminepentaacetic acid, Polysorbate 80 and other pH adjusting agents.

The infusion or drip infusion can be produced by sterilizing it in the final step or an aseptic operation method, for example, filtrating by a filter or the like to sterilize it and then filling it in an aseptic container. The infusion or drip infusion can be produced by dissolving a sterile powder obtained by vacuum drying and freeze-drying (which may contain a powder of pharmaceutically acceptable carrier) in suitable solvent before use.

The contents of all patent literatures arid non-patent literatures or references explicitly cited in the present specification may be incorporated herein as parts of the present specification.

The present invention will be described in more detail by the following examples, but the scope of the present invention is not limited thereto. Various changes and modifications can be made by those skilled in the art based on the description of the present invention, and these changes and modifications are also included in the present invention.

EXAMPLES

Example 1: Multicenter, Open-Label Study to Evaluate the Efficacy and Safety in Combination of Nivolumab and mFFX Therapy for Patients with Pancreatic Cancer The purpose of this clinical trial is to evaluate the efficacy and safety in combination of Nivolumab and mFFX therapy for patients with distant metastatic pancreatic cancer, having no history of chemotherapy. The clinical trial can evaluate the combined effect of Nivolumab and mFFX therapy.

Patients

Patients with distant metastatic pancreatic cancer, having no history of chemotherapy Criteria for Selecting Patients At the time of enrollment, patients which meet all of the criterion for selecting patients predetermined by taking into account those in each clinical trial previously conducted for Nivolumab and FFX or mFFX therapy can be selected. If it turns out that it does not meet the above criterion between the enrollment and the initial administration of Nivolumab, Nivolumab will not be administered, and it will drop out.

Criteria for Excluding Patients

At the time of enrollment, patients which are deemed to fall into any of the criterion for excluding patients predetermined by taking into account those in each clinical trial in connection with Nivolumab and FFX therapy or mFFX therapy, or the precautions for selecting patients in the respective proper use guides or proper use information published in connection with Nivolumab and FFX therapy will be excluded. If it falls into any of the criterion between the enrollment and the initial administration of Nivolumab, Nivolumab will not be administered, and it will drop out.

Usage and Dosage and Time Period of Administration

Nivolumab

Nivolumab was intravenously administered at 480 mg every 4 weeks over 30 minutes, and Nivolumab was continuously administered until falling into the prescribed criterion for discontinuing the administration of Nivolumab. No change in dose of Nivolumab is allowed. When Nivolumab and mFFX therapy were administered on the same day, Nivolumab was administered initially, and at least 30 minutes after the end of Nivolumab administration, mFFX therapy started.

mFFX Therapy

Oxaliplatin was intravenously administered at 85 mg/m$^2$ over 2 hours, and then levofolinate was intravenously administered at 200 mg/m$^2$ over 2 hours. 30 minutes after the start of levofolinate administration, irinotecan was intravenously administered at 150 mg/m$^2$ over 1.5 hours. Further, after completion of levofolinate administration, fluorouracil was intravenously administered at 2400 mg/m$^2$ over 46 hours. This was set as one cycle and repeated every 2 weeks.

The therapeutic agents (oxaliplatin, levofolinate, irinotecan and fluorouracil) used in the mFFX therapy of this clinical study were commercial products.

Schedule for Clinical Dtudy

Figure 1:
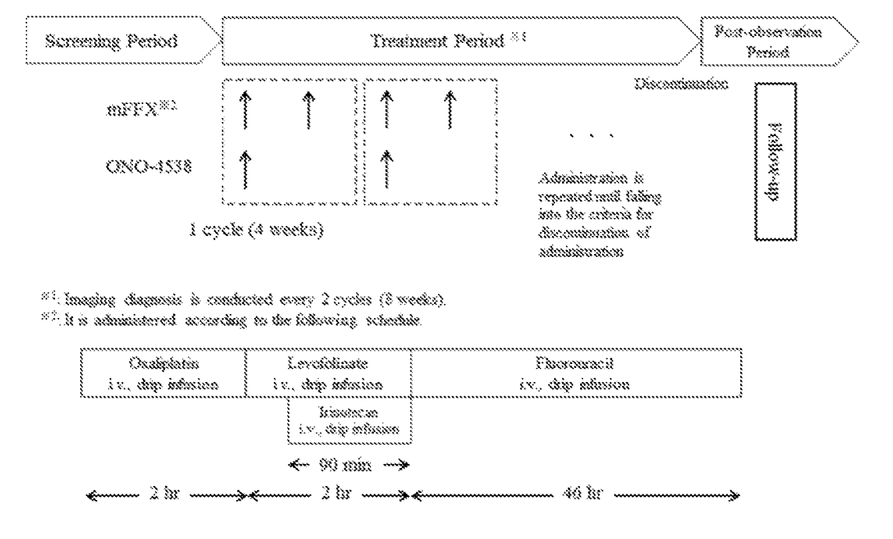
The FIGURE shows the outline of the clinical trial schedule for a multicenter, open-label study evaluating the efficacy and safety of Nivolumab in combination with mFFX therapy in patients with pancreatic cancer.

This study consists of a screening period, treatment period, and post-observation period. The FIGURE shows the outline of schedule for the clinical trial.

In the screening period (−7 to −1 days before the start of treatment), the investigator or subinvestigator incorporated patients which was judged to meet the above criteria for selection and did not fall into the above criteria for exclusion, and thereby is eligible for this clinical study.

During the treatment period, for enrolled subjects, the combined administration started in accordance with the "usage and dosage and time period of administration" above regarding Nivolumab and the "usage and dosage and time period of administration" above regarding mFFX therapy, and in accordance with the following criteria for administration of Nivolumab and the following criteria for administration and criteria for dose-reduction and the dose at the time of dose-reduction of mFFX therapy, of which administrations were continued.

Of all subjects which received the study drugs, a subject which meets both of the following criteria for discontinuation of Nivolumab and the following criteria for discontinuation of mFFX therapy will be evaluated at the end of the treatment period (at discontinuation), and shifted to the post-observation period. In the post-observation period, the evaluation and follow-up will be conducted 28 days after the end of the treatment period.

Criteria for Administration of Nivolumab

At the start of each administration, subjects must meet all of the criterion for administration predetermined by taking into account those in clinical trials previously conducted for Nivolumab. If any of the criterion are not met, the scheduled administration of Nivolumab will be postponed. However, even if it does not meet any of the criterion, the administration of Nivolumab can be judged to be continual only when exacerbation of clinical symptoms which are judged to be due to progression of disease is not appeared, clinical benefit due to continued administration is expected, and giving the baseline of the subject and the effect of combinational drug, it can be judged that the administration of Nivolumab can be safely continued. In this case, after confirming the patient's intention to continue treatment before continuing the administration of Nivolumab, it records that in medical records and contact the sponsor (subsequent reporting to the sponsor is allowed only when it is judged that the administration of Nivolumab is necessary immediately).

Criteria for Discontinuation of Nivolumab

During the treatment period, the administration of Nivolumab to subjects which meet any of criterion for discontinuation predetermined by taking into account those in the clinical trials previously conducted for Nivolumab will be discontinued.

Criteria for mFFX Therapy

In the initial cycle of therapy, subjects must meet all of criterion for administration predetermined by taking into account those in each trial previously conducted for FFX or mFFX therapy.

Further, in the second and subsequent cycles of therapy, subjects also must meet all of criterion for administration predetermined by taking into account those in each clinical trial previously conducted for FFX therapy or mFFX therapy. The administration will be postponed until clinical laboratory values on the date of the scheduled administration return to a condition meeting the criteria, and it will be administered after confirming that each drug is not contraindicated.

Criteria for Dose-Reduction of mFFX Therapy and Dose at the Time of Dose-Reduction It is conducted in accordance with the "criteria for dose-reduction" and the "dose at the time of dose-reduction" described in "Notes on using chemotherapy (FOLFIRINOX) for incurable and unresectable pancreatic cancer" in the notification of Ministry of Director of Pharmaceuticals and Food Bureau Examination and Management Division, Ministry of Health, Labor and Welfare, Drug and Food Examinations 1220 No. 7, dated on December 20, Heisei 25.

Criteria for Discontinuation of mFFX Therapy

During the treatment period, mFFX therapy for the subjects which meet any of the criterion for discontinuation predetermined by taking into account those in each clinical trial previously conducted for FFX therapy or mFFX therapy will be discontinued.

Items for Evaluating the Effectiveness

The anti-tumor effect was evaluated by image diagnosis using CT/magnetic resonance imaging (MRI) on chest, abdomen and pelvis, and measuring the tumor diameter in target lesion according to RECIST guideline version 1.1. The diagnosis imaging (measurement of tumor diameter and judgement of anti-tumor effect) was conducted at the following time points.

Screening Period

−7 to −1 day before the start of treatment

Treatment Period

Cycle 2 and subsequent cycles (every 8 weeks (±7 days) from the date of the initial administration of Nivolumab) and at the end of the treatment period (or at the time of discontinuation)

Post-Observation Period 28 days after the end of the treatment period and during the follow-up period Main Evaluation Items Response Rate Secondary Evaluation Items (1) Response rate, (2) overall survival period, (3) progression-free survival period, (4) response period, (5) period until response, (6) best overall response, (7) disease control rate, (8) changing rate in the sum of tumor diameter in target lesion and (9) maximum rate of changing rate in t the sum of tumor diameter in target lesion.

Items for Evaluating the Safety

For the following evaluation items, investigators conducted measurements, tests and surveys at prescribed times.
(1) Adverse events, (2) general laboratory tests (hematological tests, blood biochemical tests, urine qualitative tests, immunological tests, hormone tests) and (3) vital signs (systolic blood pressure/diastole blood pressure, pulse rate, body temperature)

Results of Effectiveness Evaluation 6 months after the first subject was enrolled, for 7 subjects in which the image diagnosis twice every 8 weeks as defined in the clinical trial protocol was completed (16 weeks after the start of administration of the drug), the effectiveness was evaluated (central judgment). The response rate was 42.9% (CR: 0 cases, PR: 3 cases).

INDUSTRIAL AVAILABILITY

The therapy of the present invention is particularly useful as a new therapy for cancer difficult to treat with conventional therapies.

All publications, patents and patent applications cited herein are hereby incorporated by reference in their entirety.

The invention claimed is:
1. A method for suppressing the progression of, suppressing the recurrence of and/or treating pancreatic cancer or biliary tract cancer comprising administering nivolumab, as an active ingredient, in combination with FOLFIRINOX therapy or a dose-reducing regimen thereof to a subject in need thereof, wherein the administrating nivolumab does not include administrating nivolumab as a preoperative therapy, wherein the preoperative therapy is a preceding therapy with an anti-cancer drug prior to cancer resection surgery, and is performed for a purpose of preventing postoperative micrometastases of invasive cancer and preventing recurrence thereof, wherein nivolumab is administered at about 3 mg/kg body weight per dose or at about 240, 360, or 480 mg per dose about every 2 to 4 weeks, wherein the FOLFIRINOX therapy comprises administrations of oxaliplatin (L-OHP), irinotecan hydrochloride hydrate (CPT-11), levofolinate calcium (I-LV), and fluorouracil (5-FU), and wherein the dose-reducing regimen of the FOLFIRINOX therapy comprises a reduction of a dose of any of the L-OHP, CPT-11, I-LV, or 5-FU from the initial administration or in any of the administrations during the second and subsequent cycles of the FOLFIRINOX therapy.

2. The method according to claim 1, wherein nivolumab is administered every 2 weeks, 3 weeks, or 4 weeks.

3. The method according to claim 1, wherein nivolumab is intravenously administered for about 30 minutes to about 60 minutes or for about 60 minutes or more.

4. The method according to claim 1, wherein nivolumab is administered at 3 mg/kg body weight per dose or 240 mg per dose every 2 weeks, or 480 mg per dose every 4 weeks.

5. The method according to claim 1, wherein nivolumab is administered at 480 mg per dose every 4 weeks.

6. The method according to claim 5, wherein nivolumab is intravenously administered at 480 mg per dose every 4 weeks over about 30 minutes.

7. The method according to claim 1, wherein nivolumab is administered in combination with FOLFIRINOX therapy, wherein the FOLFIRINOX therapy comprises, in this order:
(i) administering 85 mg/m$^2$ of oxaliplatin (L-OHP) intravenously over 2 hours,
(ii) administering 200 mg/m$^2$ of levofolinate calcium (I-LV) intravenously over 2 hours,
(iii) 30 minutes after start of administration of levofolinate calcium, administering 180 mg/m$^2$ of irinotecan hydrochloride hydrate (CPT-11) intravenously over 1.5 hours, and
(iv) after completion of the administration of levofolinate calcium, administering 400 mg/m$^2$ of fluorouracil (5-FU) intravenously, followed by further administering 2400 mg/m$^2$ of fluorouracil (5-FU) intravenously over 46 hours, and
wherein a series of the preceding administrations (i)-(iv) is performed every 2 weeks.

8. The method according to claim 1, wherein nivolumab is administered in combination with the dose-reducing regimen of FOLFIRINOX therapy, wherein the dose-reducing regimen of FOLFIRINOX therapy comprises, in this order,
(i) administering 85 mg/m$^2$ of oxaliplatin (L-OHP) intravenously over 2 hours,
(ii) administering 200 mg/m$^2$ of levofolinate calcium (I-LV) intravenously over 2 hours,
(iii) 30 minutes after start of administration of levofolinate calcium, administering 150 mg/m$^2$ of irinotecan hydrochloride hydrate (CPT-11) intravenously over 1.5 hours, and
(iv) after completion of the administration of levofolinate calcium, administering 2400 mg/m$^2$ of fluorouracil (5-FU) intravenously over 46 hours, and wherein a series of the preceding administrations (iv)-(iv) is performed every 2 weeks.

9. The method according to claim 1, wherein the administration of nivolumab and FOLFIRINOX therapy or a dose-reducing regimen thereof are prescribed on the same day, and wherein nivolumab is initially administered, and at least about 30 minutes after completion of administration nivolumab, FOLFIRINOX therapy or a dose-reducing regimen thereof is started.

10. The method according to claim 1, which is for pancreatic cancer.

11. The method according to claim 10, wherein the pancreatic cancer is pancreatic ductal cancer, insulinoma or intraductal papillary mucinous neoplasm.

12. The method according to claim 1, wherein the subject is a patient with pancreatic cancer which has not been previously treated with any anti-cancer drugs.

13. The method according to claim 1, wherein the subject is a patient with distant metastatic pancreatic cancer.

14. The method according to claim 1, wherein the subject is a patient with distant metastatic pancreatic cancer which has not been previously treated with any anti-cancer drugs.

15. The method according to claim 1, wherein nivolumab is administered only in combination with FOLFIRINOX therapy or a dose-reducing regimen thereof.

16. A method for suppressing the progression of, suppressing the recurrence of and/or treating distant metastatic pancreatic cancer which has not been previously treated with any anti-cancer drugs, comprising administering nivolumab, as an active ingredient, only in combination with a dose-reducing regimen of FOLFIRINOX therapy to a subject in need thereof,
wherein (1) nivolumab is intravenously administered at 480 mg per dose over 30 minutes every 4 weeks, and
(2) in the dose-reducing regimen,
(i) 85 mg/m$^2$ of oxaliplatin (L-OHP) is intravenously administered over 2 hours,
(ii) 200 mg/m$^2$ of levofolinate calcium (l-LV) is intravenously administered over 2 hours,
(iii) 30 minutes after the start of administration of levofolinate calcium, 150 mg/m$^2$ of irinotecan hydrochloride hydrate (CPT-11) is intravenously administered over 1.5 hours, and
(iv) after completion of administration of levofolinate calcium, 2400 mg/m$^2$ of fluorouracil (5-FU) is intravenously administered over 46 hours, and
wherein a series of the preceding administrations (i)-(iv) is performed every 2 weeks.

17. The method according to claim 16, wherein the administration of nivolumab and the dose-reducing regimen of FOLFIRINOX therapy are prescribed on the same day, and wherein nivolumab is initially administered, and at least about 30 minutes after completion of administration of nivolumab, the dose-reducing regimen of FOLFIRINOX therapy is started.

* * * * *